United States Patent
Nanjundaiah et al.

(10) Patent No.: US 9,952,575 B2
(45) Date of Patent: Apr. 24, 2018

(54) ENERGY MANAGEMENT SYSTEMS AND METHODS

(71) Applicants: Dattaguru Basavapatna Nanjundaiah, Bangalore (IN); Arun Chaitanya Mandala, Machilipatnam (IN); Guruprasad Chandrasekharaiah, Bangalore (IN)

(72) Inventors: Dattaguru Basavapatna Nanjundaiah, Bangalore (IN); Arun Chaitanya Mandala, Machilipatnam (IN); Guruprasad Chandrasekharaiah, Bangalore (IN)

(73) Assignee: CARRIER CORPORATION, Farmington, CT (US)

( * ) Notice: Subject to any disclaimer, the term of this patent is extended or adjusted under 35 U.S.C. 154(b) by 331 days.

(21) Appl. No.: 14/754,545

(22) Filed: Jun. 29, 2015

(65) Prior Publication Data
US 2016/0327924 A1 Nov. 10, 2016

(30) Foreign Application Priority Data
May 6, 2015 (IN) .......................... 2309/CHE/2015

(51) Int. Cl.
G06F 15/16 (2006.01)
G05B 19/042 (2006.01)
H04H 60/23 (2008.01)
H04L 12/24 (2006.01)
H04L 29/06 (2006.01)

(52) U.S. Cl.
CPC ........... *G05B 19/042* (2013.01); *H04H 60/23* (2013.01); *H04L 41/082* (2013.01); *H04L 41/0813* (2013.01); *H04L 63/20* (2013.01)

(58) Field of Classification Search
CPC ... H04L 63/20; H04L 41/0813; H04L 41/082; H04H 60/23
See application file for complete search history.

(56) References Cited

U.S. PATENT DOCUMENTS 5,889,980 A * 3/1999 Smith, Jr. ........... G06F 9/30025
708/204
8,626,344 B2 * 1/2014 Imes ...................... H04L 67/42
455/419
2007/0198975 A1 * 8/2007 Alnas ...................... G06F 8/60
717/168

(Continued)

*Primary Examiner* — Chirag R Patel
(74) *Attorney, Agent, or Firm* — Cantor Colburn LLP (57) ABSTRACT

This disclosure relates generally to energy management and more particularly to energy management systems and methods. In one embodiment, a method of communicating data within an energy management system is disclosed. The method includes performing energy management analytics on data collected from a plurality of devices in the energy management system. The method further includes transmitting a plurality of dynamically configurable data frames. Each dynamically configurable data frame comprising at least a portion of data collected from the plurality of devices and a result of the energy management analytics and being encrypted in a format that avoids transmission of a plurality of repetitive data parameters. The method includes decrypting the plurality of dynamically configurable data frames received to perform advanced analytics on the data and the result.

17 Claims, 8 Drawing Sheets

(56) References Cited

U.S. PATENT DOCUMENTS

| | | | |
|---|---|---|---|
| 2010/0283606 A1* | 11/2010 | Tsypin | G06Q 30/02 340/540 |
| 2015/0049682 A1* | 2/2015 | Seo | H04W 52/146 370/329 |
| 2016/0020903 A1* | 1/2016 | de Perthuis | H04L 9/30 380/44 |

* cited by examiner

ENERGY MANAGEMENT SYSTEMS AND METHODS

PRIORITY CLAIM

This U.S. patent application claims priority under 35 U.S.C. § 119 to: Indian Application No. 2309/CHE/2015, filed on May 6, 2015. The aforementioned application is incorporated herein by reference in its entirety.

TECHNICAL FIELD

This disclosure relates generally to energy management and more particularly to energy management systems and methods.

BACKGROUND

In an energy management system, one of the most critical aspects is collection of data from devices installed at different sites within an organization and thereafter transmitting that data to a central server for performing analytics for energy savings.

In conventional energy management systems, electronic meters are primarily designed for reading recorded data via an optical port. These electronic meters may also include ports for connectors other than the optical port to enable wireless collection of data by Automated Meter Reading (AMR) systems. However, owing to the size of the data, significant amount of bandwidth is consumed for transmitting this data to a central server or processor, thereby making the AMR systems less economically viable because of the cost associated with wireless transfer of data.

SUMMARY

In one embodiment, a method of communicating data within an energy management system is disclosed. The method includes performing energy management analytics on data collected from a plurality of devices in the energy management system. The method further includes transmitting a plurality of dynamically configurable data frames. Each dynamically configurable data frame comprising at least a portion of data collected from the plurality of devices and a result of the energy management analytics and being encrypted in a format that avoids transmission of a plurality of repetitive data parameters. The method includes decrypting the plurality of dynamically configurable data frames received to perform advanced analytics on the data and the result.

In another embodiment, an energy management system comprising a plurality of devices is disclosed. The energy management system includes at least one processors; and a computer-readable medium storing instructions that, when executed by the at least one processor, cause the at least one processor to perform operations that include performing energy management analytics on data collected from a plurality of devices in the energy management system. The operations further include transmitting a plurality of dynamically configurable data frames. Each dynamically configurable data frame comprising at least a portion of data collected from the plurality of devices and a result of the energy management analytics and being encrypted in a format that avoids transmission of a plurality of repetitive data parameters. The operations include decrypting the plurality of dynamically configurable data frames received to perform advanced analytics on the data and the result.

SUMMARY

In yet another embodiment, an energy management device is disclosed. The energy management device includes at least one processor configured to perform energy management analytics on data collected from a plurality of devices in an energy management system. The at least processor further configured to transmit a plurality of dynamically configurable data frames. Each dynamically configurable data frame comprising at least a portion of data collected from the plurality of devices and a result of the energy management analytics and being encrypted in a format that avoids transmission of a plurality of repetitive data parameters.

In another embodiment, a data receiver device in an energy management system is disclosed. The data receiver device includes at least one processor configured to receive a plurality of dynamically configurable data frames. Each dynamically configurable data frame comprising at least a portion of data collected from a plurality of devices and a result of energy management analytics performed on the data and being encrypted in a format that avoids transmission of a plurality of repetitive data parameters. The at least one processor is further configured to decrypt the plurality of dynamically configurable data frames received to perform advanced analytics on data and the result.

In yet another embodiment, a non-transitory computer-readable storage medium for communicating data within an energy management system is disclosed. The non-transitory computer-readable storage medium when executed by a computing device, cause the computing device to perform energy management analytics on data collected from a plurality of devices in the energy management system; transmit a plurality of dynamically configurable data frames, each dynamically configurable data frame comprising at least a portion of data collected from the plurality of devices and a result of the energy management analytics and being encrypted in a format that avoids transmission of a plurality of repetitive data parameters; and decrypt the plurality of dynamically configurable data frames received to perform advanced analytics on the data and the result.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
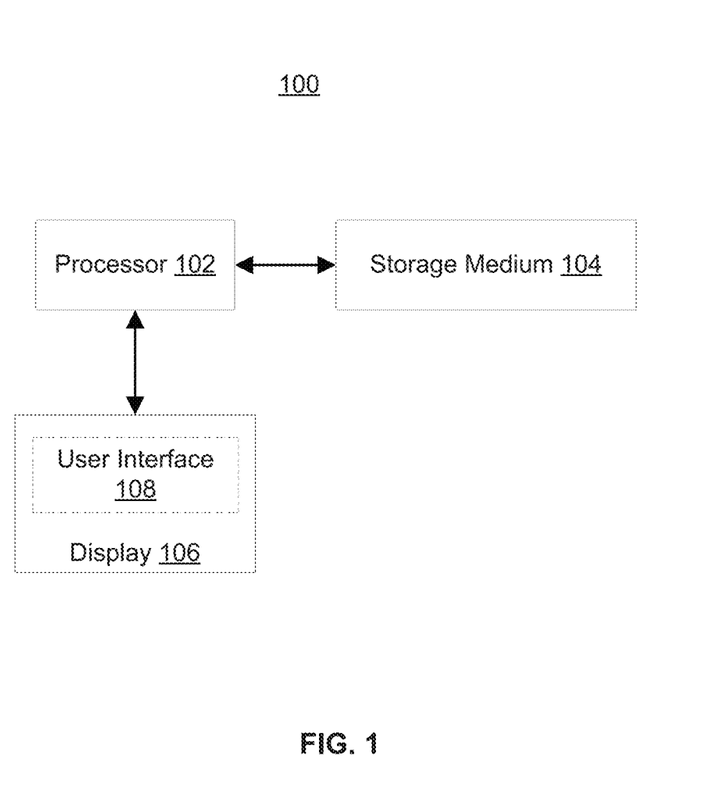
FIG. 1 illustrates a system for energy management, in accordance with an embodiment.

Additional illustrative embodiments are listed below. In one embodiment, a system 100 for energy management is illustrated in FIG. 1, in accordance with an embodiment. In particular, system 100 is configured to communicate data within an energy management system. System 100 includes one or more processors (for example, a processor 102), a storage medium (for example, a memory) 104, and a display 106. Storage medium 104 stores instructions that, when executed by the one or more processors, cause the one or more processors to communicate data by transmitting a plurality of dynamically configurable data frames within an energy management system in accordance with various embodiments. In an embodiment, storage medium 104 may be a computer readable medium. System 100 interacts with users through a user interface 108 accessible to the users via display 106. Display 106 may be used to display energy saving opportunities to the user.

Figure 2:
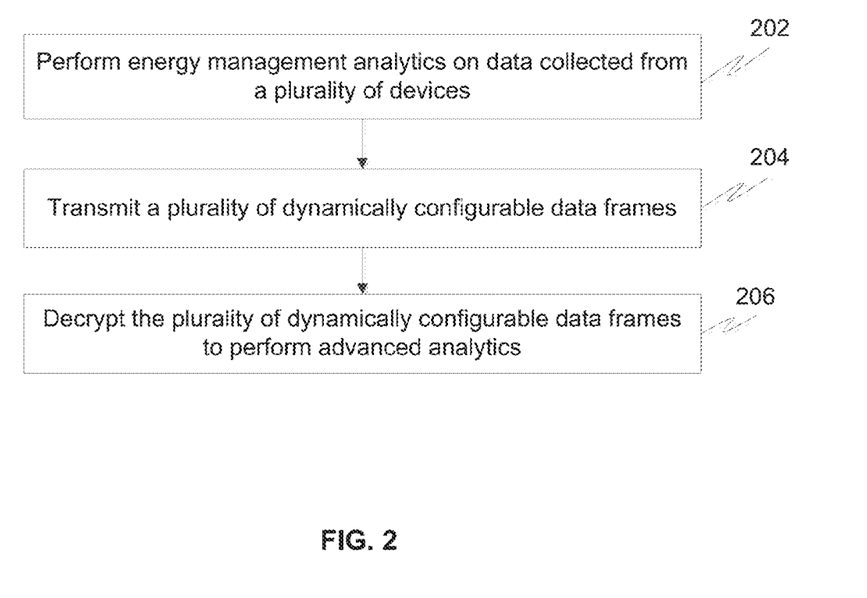
FIG. 2 illustrates a flowchart of a method of communicating data within an energy management system, in accordance with an embodiment.

FIG. 2 illustrates a flowchart of a method of communicating data within an energy management system, in accordance with an embodiment. The energy management system includes a plurality of devices, which may include but are not limited to energy meter, temperature sensors, and electrical appliances. The plurality of devices may also be called peripheral devices. To facilitate energy management, data is collected from these plurality of devices based on availability of libraries associated with each of these devices. Therefore, if for a particular device an associated library is not available, either data may not be collected for that device or the associated library may be acquired through Download Over The Air (DOTA). This is further explained in detail in conjunction with FIG. 3.

After collecting the data, energy management analytics is performed on data collected from the plurality of devices at 202. The result of the energy management analytics includes deviations, alerts, and alarms associated with the plurality of devices. By way of an example, based on the analytics performed on the data collected from a temperature sensor, a deviation from the accepted temperature levels may be detected. Accordingly, subsequent result of the analytics may be to generate an alarm. In order to perform the energy management analytics, a plurality of parameters associated with the data collected from the plurality of devices are correlated. This is further explained in detail in conjunction with FIG. 3.

Thereafter, a plurality of dynamically configurable data frames are created, such that, each dynamically configurable data frame includes one or more portions of the data collected from the plurality of devices and result of the energy management analytics performed on the data. To enable dynamic configuration of a data frame, a positioning key is encoded in the data frame. The positioning key indicates location of different data types included within a dynamically configurable data frame. Creation of dynamically configurable data frames is further explained in detail in conjunction with FIG. 4.

Subsequently, each of the plurality of dynamically configurable data frames is transmitted, at 204. To enable secure and efficient transmission, the plurality of dynamically configurable data frames are encrypted in a format that avoids transmission of a plurality of repetitive data parameters. Examples of a repetitive data parameter may include, but are not limited to a device ID associated with each of the plurality of devices, values measured by each device, time stamps associated with the measured values. The format used to avoid transmission of repetitive data parameters is explained in detail in conjunction with FIG. 4.

Once the plurality of dynamically configurable data packets are received, they are decrypted at 206 in order to perform advanced analytics on the data and the result encrypted in the plurality of dynamically configurable data packets. This is further explained in detail in conjunction with FIG. 3.

Figure 3:
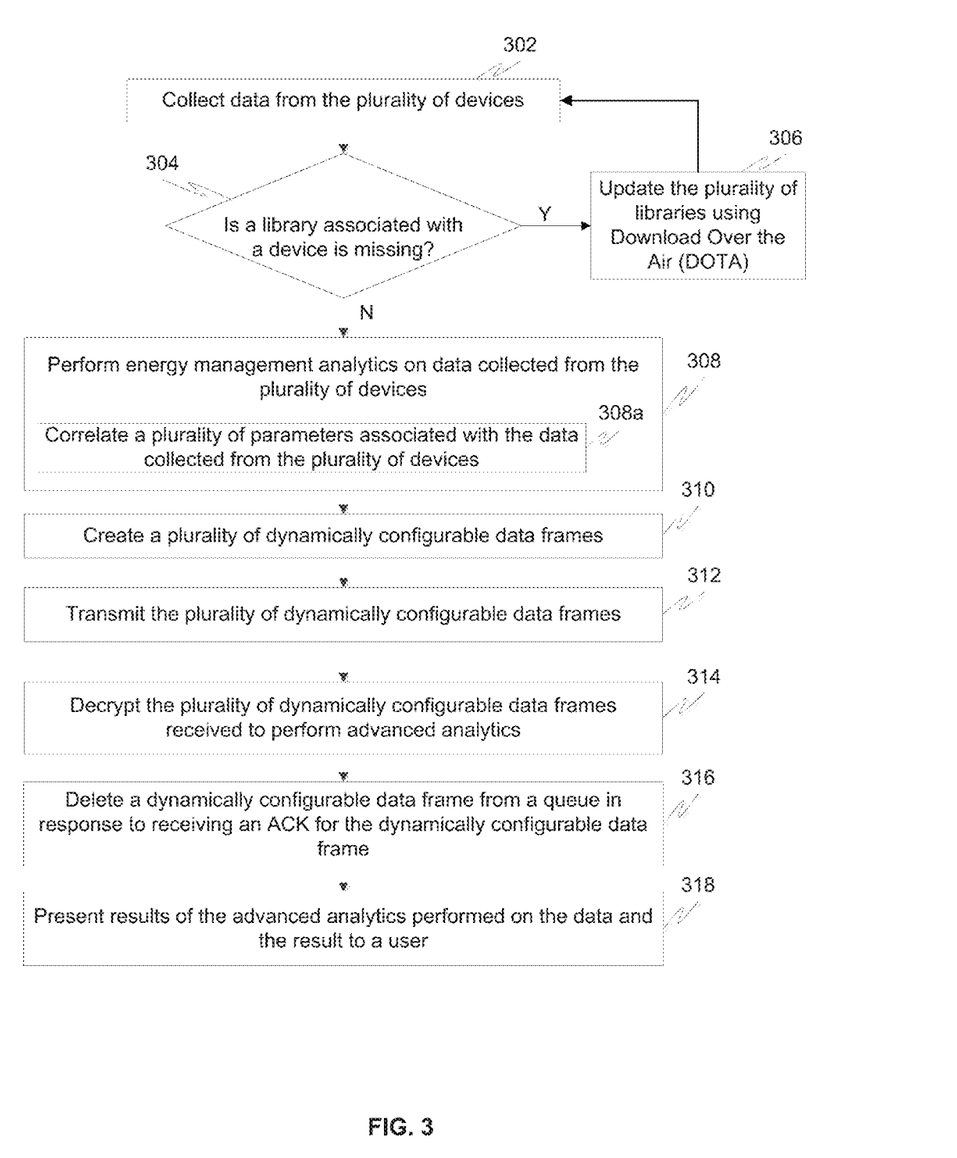
FIG. 3 illustrates a flowchart of a method of communicating data within an energy management system, in accordance with another embodiment.

FIG. 3 illustrates a flowchart of a method of communicating data within an energy management system, in accordance with another embodiment. At 302, data is collected from the plurality of devices. In an embodiment, data may be collected by sending a query to each device. Thereafter, results received in response to the query sent to each device are checked and reviewed by system firmware to identify any anomalies in the results. In case a device is not supported, the data included in the result received for a query sent to that device may be out of range and thus may be ignored. For example, positive range temperature recordings received from a temperature sensor that is supposed to send temperature data in negative range is considered to be out of range. In this case, the positive range temperature recordings will be ignored. This anomaly may be encoded in a packet as an error flag, as a result, when the packet is parsed it may be identified that the device is not supported.

Thereafter, at 304, a check is performed to determine whether a library associated with a device that is not supported is missing. When a library associated with the device is missing, the plurality of libraries are updated using Download Over the Air (DOTA) at 306. In an embodiment, the device for which an associated library is not available is identified manually. Alternatively, the device may be automatically identified. Thereafter, system firmware may be upgraded with the library associated with the unsupported device using DOTA. After the upgrade, the control goes back to 302.

However, when each of the plurality of devices has an associated library, then at 308, energy management analytics are performed on data collected from the plurality of devices. To perform the energy management analytics, at 308a, a plurality of parameters associated with the data collected from the plurality of devices is correlated. By way of an example, to detect a Grid Supply (EB) and Diesel Generator (DG) overlap and accordingly activate a hooter trigger, parameters that may include EB Voltage, DG Voltage, EB Power, DG Power, and Hooter flag are correlated. In this scenario, when EB and DG are running together, correlation of EB and DG Voltage and EB and DG power may trigger a hooter. Accordingly, in this case three types of alarms may be generated, i.e., DG Idle Run, EB Idle Run, and running on DG. By way of another example, to detect fuel pilferage for a DG, parameters that may include running hours of DG and fuel level for DG are correlated. In this scenario, based on correlation of these parameters, fuel theft may be identified and an alarm may accordingly be triggered.

Thereafter, at 310, a plurality of dynamically configurable data frames are created. This is further explained in detail in conjunction with FIG. 4. The plurality of dynamically configurable data frames are then transmitted at 312. The plurality of dynamically configurable data frames are stored in a queue before being transmitted. When the plurality of dynamically configurable data frames are received, they are decrypted at 314, in order to perform advanced analytics on the data and the results. At 316, when an Acknowledgement (ACK) is received for a dynamically configurable data frame, it is deleted from the queue. Alternatively, when a Negative Acknowledgement (NACK) is received for a dynamically configurable data frame, it is retransmitted. In an embodiment, once the plurality of dynamically configurable data frames are received by a data receiver, they are validated and stored in a database. Thereafter, the data and the results encrypted in the plurality of dynamically configurable data frames are decrypted. This enables identifying a device from where the data has originated. The database in the data receiver is thereafter updated with the information derived from the plurality of dynamically configurable data frames. The information so derived may include, but is not limited to temperature readings, fuel consumption, and electricity consumption.

Once the plurality of dynamically configurable data frames have been decrypted, result of the advanced analytics is presented to a user of the energy management system at 318. Result of the advanced analytics may include deviations from the standard readings and saving opportunities. These may be presented to the user as suggestions on energy savings.

As a result of the frames being dynamically configurable, repeated decryption of the dynamically configurable data frames does not disclose the pattern of encrypting various data fields within these data frames. Thus, these data frames are more secure and are not prone to attacks from hackers. The security is further enhanced as the data in these data frames is encrypted in hexadecimal format. Moreover, as the format of encryption avoids transmission of repetitive data parameters, for example, device ID, the data frames are considerably smaller in size and thus require less bandwidth for transmission. In addition to requiring less bandwidth, the time required for processing the dynamically configurable data frames at the server or the processor is also lowered. This quick processing of dynamically configurable data frames enables timely switching off of devices, thereby increasing energy savings for an organization. Moreover, less processing time results in promptly showing critical alerts/alarms to the customer, thereby, helping the customer to take precautionary measures at the earliest.

Figure 4:
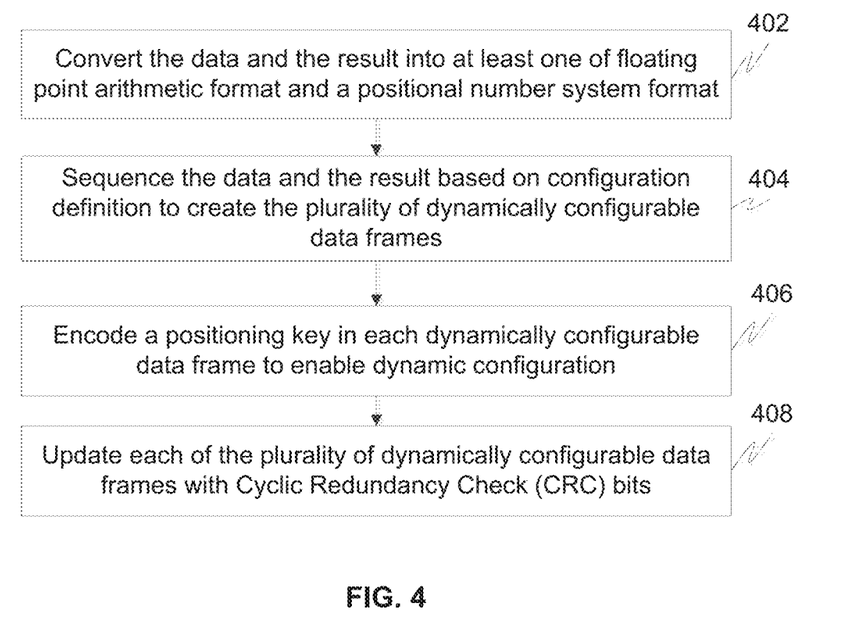
FIG. 4 is a flowchart of a method for creating a plurality of dynamically configurable data frames, in accordance with an embodiment.

FIG. 4 is a flowchart of a method for creating a plurality of dynamically configurable data frames, in accordance with an embodiment. After the data has been collected from the plurality of devices and energy management analytics has been performed on the data, the plurality of dynamically configurable data frames that include the data and results of the energy management analytics are created. To this end, at 402, the data and the results are converted into one or more of a floating point arithmetic format and a positional number system format. The floating point arithmetic format, for example, may include but is not limited to IEEE-754 format. Additionally, the positional number system format, for example, may include but is not limited to hexadecimal format, base32 format, base64 format, and Triacontakaidecimal format. In an exemplary embodiment, all floating values are converted to IEEE-754 format and all alarms and positioning data are converted into hexadecimal format. This is further explained in conjunction with an exemplary dynamically configurable data frame shown in FIG. 5.

Thereafter, at 404, the data and the results are sequenced based on configuration definition to create the plurality of dynamically configurable data frames. The configuration definition can be derived from the plurality of libraries associated with the plurality of devices. As a result of converting the data and the results and subsequently sequencing them based on configuration definition, a plurality of repetitive data parameters are not required to be encrypted within a dynamically configurable data frame. Examples of a repetitive data parameter may include but are not limited to a device ID associated with each of the plurality of devices, values measured by each device, time stamps associated with the measured values.

Further, in order to enable dynamic configuration, a positioning key is also encoded in a dynamically configurable data frame at 406. The positioning key indicates location of different data types within the dynamically configurable data frame. As a result of the position key being encoded, a data frame becomes dynamically configurable as new data fields can be appended in the data frame by merely modifying the position key. As a result, the data frame and the type of data being encoded in the data frame need not be fixed and can be repeatedly modified in subsequent transmissions. Thereby, making the data frame dynamically configurable. Additionally, encoding the position key also makes the dynamically configurable data frame more secure and mitigates the risk of data frame being decrypted by a hacker. This is enabled, as the position key facilitates modification of placement of different data types within subsequent transmissions of dynamically configurable data frames.

Thereafter, at 408, each of the plurality of dynamically configurable data frame is updated with Cyclic Redundancy Check (CRC) bits. The plurality of dynamically configurable data frames are then appended with transport layer packets before being transmitted.

Figure 5:
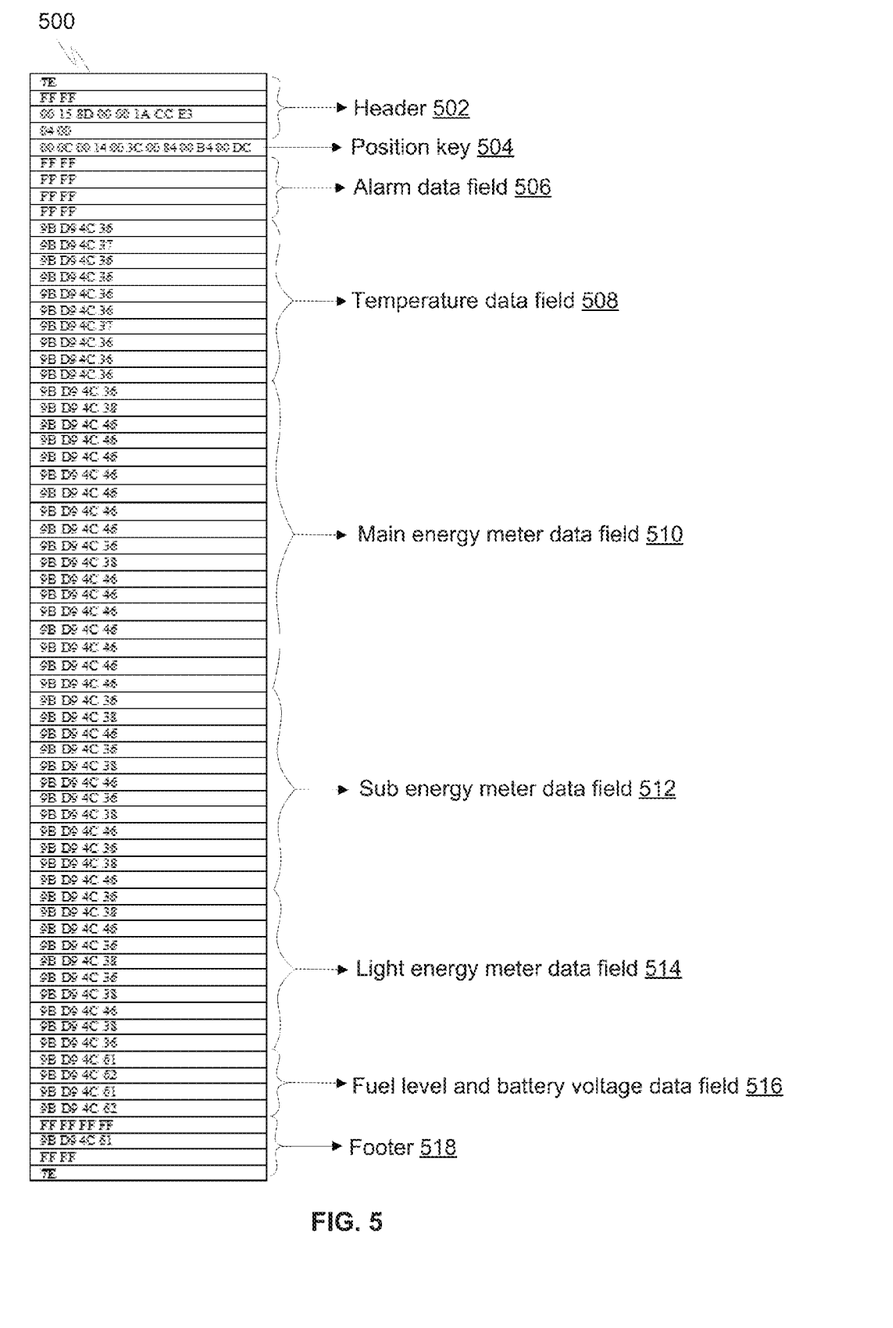
FIG. 5 illustrates a dynamically configurable data frame, in accordance with an exemplary embodiment.

FIG. 5 illustrates a dynamically configurable data frame 500, in accordance with an exemplary embodiment. Dynamically configurable data frame 500 includes a header 502, a position key 504, an alarm data field 506, a temperature data field 508, a main energy meter data field 510, a sub energy meter data field 512, a light energy meter data field 514, a fuel level and battery voltage data field 516, and a footer 518. Information included within each of the above mentioned data fields is encrypted in hexadecimal or IEEE-754 format.

Various fields in header 502 include information in the following sequence: start of the packet→7E, project ID information→FF FF, IMEI number→00 15 8 D 00 00 1A CC E3, and firmware version information→04 00. Further, position key 504 includes information regarding location of different data fields within body of dynamically configurable data frame 500. This information is represented as: 00 0C 00 14 00 3C 00 84 00 B4 00 DC, and is indicative of the location of different data fields as represented in Table 1:

TABLE 1

| Start of location of Data field | Data field |
| --- | --- |
| 00 0C | Alarm data |
| 00 14 | Temperature data |
| 00 3C | Main energy meter data |
| 00 84 | DG energy meter data |
| 00 B4 | Light energy meter data |
| 00 DC | Fuel level and battery voltage data |

As a result, when a dynamically configurable data frame is received, position key enables determination of start of location of different data field within the data frame.

Alarm data field 506 includes information associated with different types of alarms that have been generated in the energy management system. Temperature data field 508 includes temperature data recorded by temperature sensors placed at different sites within an organization. Main energy meter data field 510 includes information associated with voltage for all three phases, power for all three phases, energy, running hours, and power factor for multiple energy meters used in the energy management system. Similarly, sub energy meter data field 512 may include information associated with energy, running hours, and total power for multiple DG energy meters and multiple HVAC energy meters in the energy management system.

Further, light energy meter data field 514 includes information associated with power for all three phases, energy, and running hours. Fuel level and battery voltage data field 516 includes information associated with fuel level in multiple DG supply units and voltage level for multiple batteries used in the energy management system. Lastly, various fields in footer 518 include information in the following sequence: alarm and data queue→FF FF FF FF; time stamp→9B D9 4C 61; CRC bits→FF FF; end of data frame→7E.

Thus, all the information in dynamically configurable data frame is encrypted in IEEE-754 format and hexadecimal format. As a result the need for including repetitive data parameters, for example, device ID, values measured by the devices, and time stamps for these measurements is mitigated. Thereby, reducing the size of dynamically configurable data frame 500 and accordingly the bandwidth required for transmitting dynamically configurable data frame 500.

Figure 6:
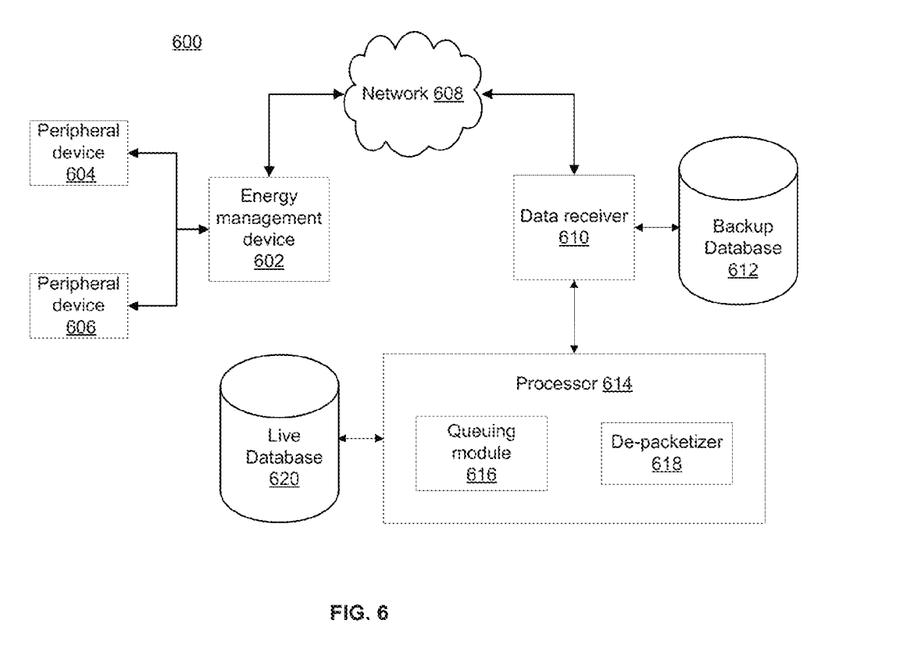
FIG. 6 illustrates a block diagram of an energy management system, in accordance with an embodiment.

FIG. 6 illustrates a block diagram of an energy management system 600, in accordance with an embodiment. Energy management system 600 includes an energy management device 602 which is in communication with a plurality of peripheral devices (for example, a peripheral device 604 and a peripheral device 606). Peripheral device 604 may be an energy meter and peripheral device 606 may be a temperature sensor. Energy management device 602 may communicate with the plurality of peripheral devices using wireless or wired means to collect data recorded by them. In an exemplary embodiment, energy management device 602 may use RS 485 channel, which is a serial communication between the plurality of devices and energy management device 602.

Once the data has been collected from the plurality of devices, energy management device 602 transmits the data through network 608 to a data receiver 610 by using a communication protocol, for example, GPRS, EDGE, 3G, or 4G protocol. The data is transmitted in the form of a plurality of dynamically configurable data frames. Data receiver 610 may receive the plurality of dynamically configurable data frames via TCP/IP network protocol and thereafter stores them in a backup database 612. Additionally, data receiver 610 communicates each dynamically configurable data frame to a processor 614 that includes a queueing module 616. Queuing module 616 queues up the plurality of dynamically configurable data frames for further processing. Processor 614 further includes a de-packetizer 618 that is adapted to decrypt each dynamically configurable data frame. This has been explained in conjunction with FIG. 2. Additionally, de-packetizer 618 parses and updates a live database 620. Each of backup database 612 and live database 620 may be a memory in the form of a hard disk.

Figure 7:
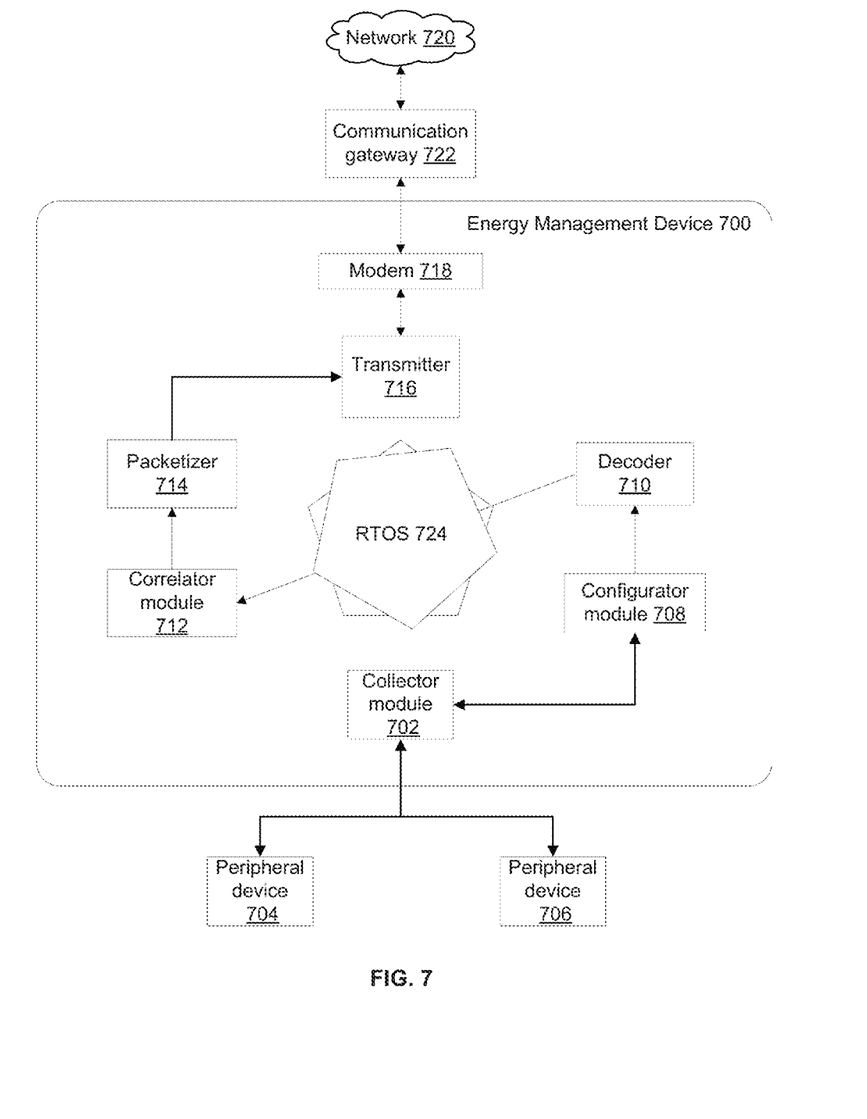
FIG. 7 illustrates an energy management device, in accordance with an embodiment.

FIG. 7 illustrates an energy management device 700, in accordance with an embodiment. Energy management device 700 includes a collector module 702 that collects data from the plurality of devices (for example, a peripheral device 704 and a peripheral device 706). In an embodiment, collector module 702 may send a query to each of peripheral device 704 and peripheral device 706. A configurator module 708 validates a plurality of libraries associated with the plurality of devices in firmware of energy management device 700. Additionally, configurator module 708 checks and reviews results received in response to the query sent to each peripheral device to identify any anomalies in the results. An anomaly in result received from a peripheral device may indicate that the peripheral device is not supported. In other words, a library associated with that peripheral device is not available in the firmware. Accordingly, configurator module 708 may upgrade the firmware with a library associated with that peripheral device using DOTA.

Configurator module 708 communicates the data collected from peripheral devices 704 and 706 to a decoder 710 that performs energy management analytics on the data collected. To perform the energy management analytics, decoder 710 communicates with a correlator module 712 that correlates a plurality of parameters associated with the data collected from peripheral devices 704 and 706. This has been explained in detail in conjunction with FIG. 3. Thereafter, a packetizer 714 creates a plurality of dynamically configurable data frames. Creation of dynamically configurable data frames has been explained in detail in conjunction with FIG. 4. Packetizer 714 stores the plurality of dynamically configurable data frames in a queue. Thereafter, a transmitter 716 transmits the plurality of dynamically configurable data frames stored in the queue. When an ACK has been received for a dynamically configurable data frame, that data frame is deleted from the queue. However, when a NACK is received for a dynamically configurable data frame, that frame is retransmitted again, until an ACK is received for that data frame.

Transmitter 716 uses a modem 718 to connect with network 720 through a communication gateway 722 in order to transmit the plurality of dynamically configurable data frames. Communication gateway 722 is hosted in a central server and performs data integrity check on each dynamically configurable data frame. Additionally, communication gateway 722 sends ACK/NACK back to transmitter 716. Various modules within energy management device 700 are seamlessly integrated by a Real Time Operating System (RTOS) 724. RTOS 724 is a low memory operating system that also performs the management of memory within energy management device 700.

Figure 8:
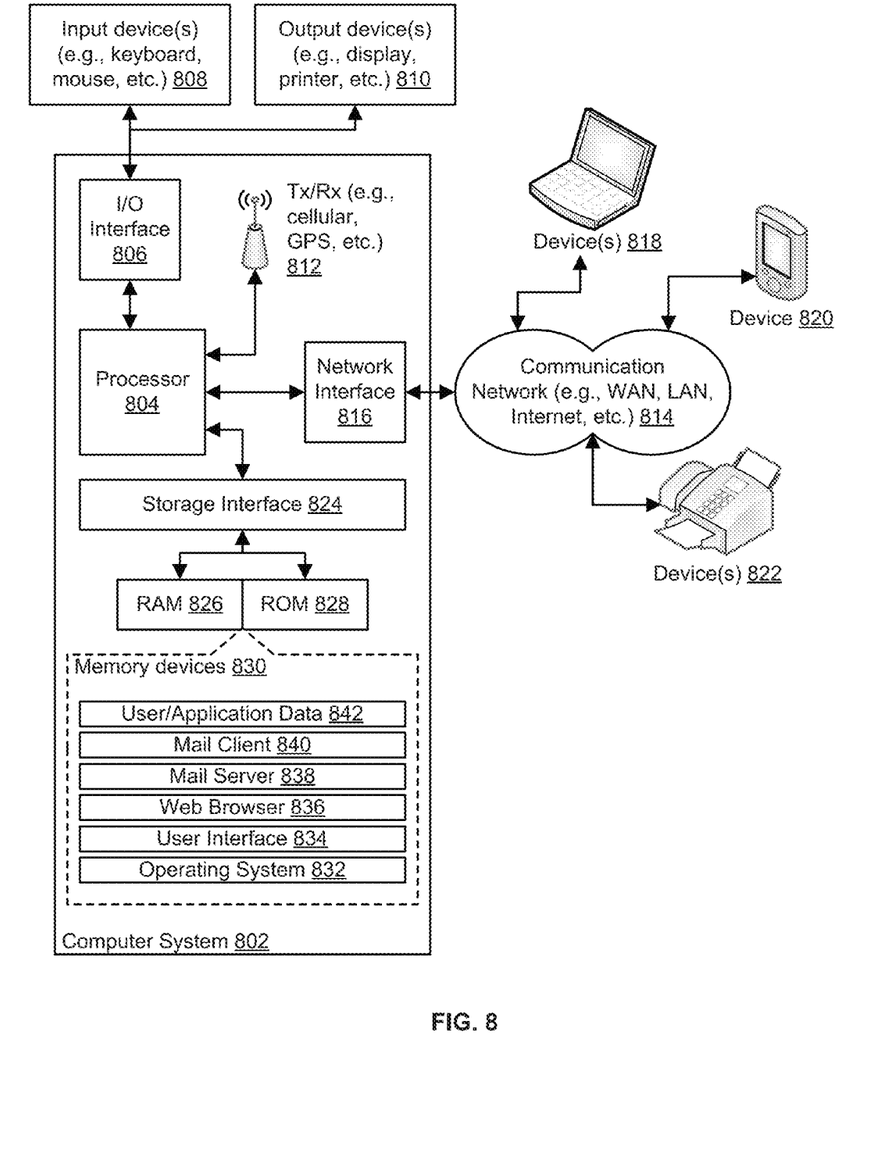
FIG. 8 illustrates an exemplary computing system that may be employed to implement processing functionality for various embodiments.

FIG. 8 illustrates an exemplary computing system 800 that may be employed to implement processing functionality for various embodiments (e.g., as a SIMD device, client device, server device, one or more processors, or the like).

Those skilled in the relevant art will also recognize how to implement the invention using other computer systems or architectures. Computing system 800 may represent, for example, a user device such as a desktop, an activity mon monitoring device, a wearable portable electronic device, a mobile phone, personal entertainment device, DVR, and so on, or any other type of special or general purpose computing device as may be desirable or appropriate for a given application or environment. Computing system 800 can include one or more processors, such as a processor 802 that can be implemented using a general or special purpose processing engine such as, for example, a microprocessor, microcontroller or other control logic. In this example, processor 802 is connected to a bus 804 or other communication medium.

Computing system 800 can also include a memory 806 (main memory), for example, Random Access Memory (RAM) or other dynamic memory, for storing information and instructions to be executed by processor 802. Memory 806 also may be used for storing temporary variables or other intermediate information during execution of instructions to be executed by processor 802. Computing system 800 may likewise include a read only memory ("ROM") or other static storage device coupled to bus 804 for storing static information and instructions for processor 802.

Computing system 800 may also include storage devices 808, which may include, for example, a media drive 810 and a removable storage interface. The media drive 810 may include a drive or other mechanism to support fixed or removable storage media, such as a hard disk drive, a floppy disk drive, a magnetic tape drive, an SD card port, a USB port, a micro USB, an optical disk drive, a CD or DVD drive (R or RW), or other removable or fixed media drive. A storage media 812 may include, for example, a hard disk, magnetic tape, flash drive, or other fixed or removable medium that is read by and written to by media drive 810. As these examples illustrate, storage media 812 may include a computer-readable storage medium having stored therein particular computer software or data.

In alternative embodiments, storage devices 808 may include other similar instrumentalities for allowing computer programs or other instructions or data to be loaded into computing system 800. Such instrumentalities may include, for example, a removable storage unit 814 and a storage unit interface 816, such as a program cartridge and cartridge interface, a removable memory (for example, a flash memory or other removable memory module) and memory slot, and other removable storage units and interfaces that allow software and data to be transferred from removable storage unit 814 to computing system 800.

Computing system 800 can also include a communications interface 818. Communications interface 818 can be used to allow software and data to be transferred between computing system 800 and external devices. Examples of communications interface 818 can include a network interface (such as an Ethernet or other NIC card), a communications port (such as for example, a USB port, a micro USB port), Near field Communication (NFC), etc. Software and data transferred via communications interface 818 are in the form of signals which can be electronic, electromagnetic, optical, or other signals capable of being received by communications interface 818. These signals are provided to communications interface 818 via a channel 820. Channel 820 may carry signals and may be implemented using a wireless medium, wire or cable, fiber optics, or other communications medium. Some examples of channel 820 include a phone line, a cellular phone link, an RF link, a Bluetooth link, a network interface, a local or wide area network, and other communications channels.

In this document, the terms "computer program product" and "computer-readable medium" may be used generally to refer to media such as, for example, memory 806, storage devices 808, removable storage unit 814, or signal(s) on channel 820. These and other forms of computer-readable media may be involved in providing one or more sequences of one or more instructions to processor 802 for execution. Such instructions, generally referred to as "computer program code" (which may be grouped in the form of computer programs or other groupings), when executed, enable computing system 800 to perform features or functions of embodiments of the present invention.

In an embodiment where the elements are implemented using software, the software may be stored in a computer-readable medium and loaded into computing system 800 using, for example, removable storage unit 814, media drive 810 or communications interface 818. The control logic (in this example, software instructions or computer program code), when executed by processor 802, causes processor 802 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide energy management methods and systems. The data collected from a plurality of devices and results of energy management analytics performed on the data are encrypted in dynamically configurable data frames. As a result of the frames being dynamically configurable, repeated decryption of the dynamically configurable data frames does not disclose the pattern of encrypting various data fields within these data frames. Thus, these data frames are more secure and are not prone to attacks from hackers. The security is further enhanced as the data in these data frames is encrypted in hexadecimal format. Moreover, as the format of encryption avoids transmission of repetitive data parameters, for example, device ID, the data frames are considerably smaller in size and thus require less bandwidth for transmission. In addition to requiring less bandwidth, the time required for processing the dynamically configurable data frames at the server or the processor is also lowered. This quick processing of dynamically configurable data frames enables timely switching off of devices, thereby increasing energy savings for an organization. Moreover, less processing time results in promptly showing critical alerts/alarms to the customer, thereby, helping the customer to take precautionary measures at the earliest.

The specification has described energy management methods and systems. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of communicating data within an energy management system, the method comprising:
    performing energy management analytics on data collected from a plurality of devices in the energy management system;
    creating a plurality of dynamically configurable data frames, each dynamically configurable data frame comprising at least a portion of data collected from the plurality of devices and a result of the energy management analytics and being encrypted in a format that avoids transmission of a plurality of repetitive data parameters
    appending the plurality of dynamically configurable data frames to transport layer packets for transmission as data packets via a TCP/IP network protocol; and
    transmitting the data packets comprising the plurality of dynamically configurable data frames;
    wherein creating the plurality of dynamically configurable data frames includes:
        converting the data collected from the plurality of devices into a positional number system format;
        converting the result of the energy management analytics into a floating point arithmetic format; and
        sequencing of the data and the result in response to the converting based on a configuration definition for creation of the plurality of dynamically configurable data frames, wherein the configuration definition is derived from a plurality of libraries associated with the plurality of devices.

2. The method of claim 1 further comprising collecting data from the plurality of devices based on availability of a plurality of libraries associated with the plurality of devices.

3. The method of claim 2 further comprising updating the plurality of libraries using Download Over the Air (DOTA), when a library associated with a device within the plurality of devices is missing.

4. The method of claim 1 further comprising encoding a positioning key in a dynamically configurable data frame to enable dynamic configuration, the positioning key being indicative of location of different data types within the dynamically configurable data frame, wherein the positioning key is encoded in the positional number system format.

5. The method of claim 1, wherein the plurality of repetitive data parameters comprise a device ID associated with each of the plurality of devices, values measured by each device, time stamps associated with the measured values.

6. The method of claim 1, wherein performing energy management analytics further comprises correlating a plurality of parameters associated with the data collected from the plurality of devices.

7. The method of claim 1, wherein the plurality of devices are selected from a group comprising energy meter, temperature sensors, and electrical appliances.

8. The method of claim 1 further comprising deleting a dynamically configurable data frame within the plurality of dynamically configurable data frames from a queue in response to receiving an Acknowledgement (ACK) for the dynamically configurable data frame.

9. The method of claim 1 further comprising presenting results of the advanced analytics performed on the data and the result to a user of the energy management system.

10. An energy management system comprising a plurality of devices, the energy management system comprising:
    at least one processors; and
    a computer-readable medium storing instructions that, when executed by the at least one processor, cause the at least one processor to perform operations comprising:
    performing energy management analytics on data collected from the plurality of devices in the energy management system;
    creating a plurality of dynamically configurable data frames, each dynamically configurable data frame comprising at least a portion of data collected from the plurality of devices and a result of the energy management analytics and being encrypted in a format that avoids transmission of a plurality of repetitive data parameters
    appending the plurality of dynamically configurable data frames to transport layer packets for transmission as data packets via a TCP/IP network protocol; and
    transmitting the data packets comprising the plurality of dynamically configurable data frames;
    wherein creating the plurality of dynamically configurable data frames includes:
        converting the data collected from the plurality of devices into a positional number system format;
        converting the result of the energy management analytics into a floating point arithmetic format: and
        sequencing of the data and the result in response to the converting based on a configuration definition for creation of the plurality of dynamically configurable data frames, wherein the configuration definition is derived from a plurality of libraries associated with the plurality of devices.

11. The energy management system of claim 10, wherein the operations further comprises collecting data from the plurality of devices based on availability of a plurality of libraries associated with the plurality of devices.

12. The energy management system of claim 11, wherein the operations further comprise updating the plurality of libraries using Download Over the Air (DOTA), when a library associated with a device within the plurality of devices is missing.

13. The energy management system of claim 10, wherein the operation of creating further comprises encoding a positioning key in a dynamically configurable data frame to enable dynamic configuration, the positioning key being indicative of location of different data types within the dynamically configurable data frame wherein the positioning key is encoded in the positional number system format.

14. The energy management system of claim 11, wherein the operation of performing energy management analytics further comprises operation of correlating a plurality of parameters associated with the data collected from the plurality of devices.

15. The energy management system of claim 11, wherein the operations further comprise deleting a dynamically configurable data frame within the plurality of dynamically configurable data frames from a queue in response to receiving an acknowledgement (ACK) for the dynamically configurable data frame.

16. The energy management system of claim 11, wherein the operations further comprise presenting results of the advanced analytics performed on the data and the result to a user of the energy management system.

17. A non-transitory computer-readable storage medium for communicating data within an energy management system, when executed by a computing device, cause the computing device to:

perform energy management analytics on data collected from a plurality of devices in the energy management system;

create a plurality of dynamically configurable data frames, each dynamically configurable data frame comprising at least a portion of data collected from the plurality of devices and a result of the energy management analytics and being encrypted in a format that avoids transmission of a plurality of repetitive data parameters;

append the plurality of dynamically configurable data frames to transport layer packets for transmission as data packets via a TCP/IP network protocol; and transmit the data packets comprising the plurality of dynamically configurable data frames;

wherein the plurality of dynamically configurable data frames are created by at least:
  converting the data into a positional number system format;
  converting the result into a floating point arithmetic format; and
  sequencing of the data and the result in response to the converting based on a configuration definition for creation of the plurality of dynamically configurable data frames, wherein the configuration definition is derived from a plurality of libraries associated with the plurality of devices.

* * * * *